(12) United States Patent
Wada et al.

(10) Patent No.: US 11,288,786 B2
(45) Date of Patent: Mar. 29, 2022

(54) INFORMATION PROCESSING DEVICE, METHOD AND MEDIUM

(71) Applicant: PFU LIMITED, Kahoku (JP)

(72) Inventors: Tomoaki Wada, Kahoku (JP); Hiroaki Kawanobe, Kahoku (JP)

(73) Assignee: PFU LIMITED, Ishikawa (JP)

( * ) Notice: Subject to any disclaimer, the term of this patent is extended or adjusted under 35 U.S.C. 154(b) by 149 days.

(21) Appl. No.: 16/515,517

(22) Filed: Jul. 18, 2019

(65) Prior Publication Data
US 2020/0302588 A1 Sep. 24, 2020

(30) Foreign Application Priority Data
Mar. 20, 2019 (JP) .............................. JP2019-052108

(51) Int. Cl.
G06T 7/00 (2017.01)
G06K 9/00 (2022.01)

(52) U.S. Cl.
CPC ........ G06T 7/0002 (2013.01); G06K 9/00449 (2013.01); G06T 2207/10008 (2013.01); G06T 2207/30168 (2013.01); G06T 2207/30176 (2013.01)

(58) Field of Classification Search
None
See application file for complete search history.

(56) References Cited

U.S. PATENT DOCUMENTS

| | | | |
|---|---|---|---|
| 2010/0123928 A1* | 5/2010 | Morimoto | G06K 9/3208 358/1.15 |
| 2013/0156307 A1* | 6/2013 | Yates | G06K 9/6284 382/165 |
| 2020/0089945 A1* | 3/2020 | Kitamura | G06K 9/00449 |

FOREIGN PATENT DOCUMENTS

JP 11-259597 A 9/1999

* cited by examiner

Primary Examiner — Leon Viet Q Nguyen
(74) Attorney, Agent, or Firm — Westerman, Hattori, Daniels & Adrian, LLP

(57) ABSTRACT

To improve the efficiency of work for checking an image obtained by imaging by a user, an information processing device acquires a plurality of images obtained by imaging a plurality of subjects, determines, for each of the plurality of images, a certainty factor with which the image has a predetermined attribute, determines, for each of the plurality of images, whether the certainty factor is less than a predetermined reference, and notifies a user of an image of which the certainty factor is determined to be less than the predetermined reference.

9 Claims, 9 Drawing Sheets

INFORMATION PROCESSING DEVICE, METHOD AND MEDIUM

CROSS-REFERENCE TO RELATED APPLICATION

This application is based upon and claims the benefit of priority of the prior Japanese Patent Application No. JP2019-052108, filed on Mar. 20, 2019, the entire contents of which are incorporated herein by reference.

FIELD

This disclosure relates to a technology for processing an image.

BACKGROUND

Conventionally, a format recognition device including a first format recognition system for extracting features in the entire form to be recognized and collating the features with feature data in the entire existing form to recognize a format of the form to be recognized, and a second format recognition system for extracting features in a part of the form to be extracted and collating the features with feature data in a part of the existing form to recognize the format of the form to be recognized has been proposed (see Japanese Patent Application Publication No. H11-259597).

SUMMARY

Conventionally, subjects to be saved as information (for example, forms, documents, business cards, receipts, and photographs/illustrations, etc.) are imaged and image data obtained by the imaging is saved to digitize information on the subjects. In this case, in order to secure the quality of information to be saved, it is automatically determined whether an image has a predetermined attribute (for example, the type of form, color/monochrome, whether the orientation of the image is correct, whether the image is blank paper, detection of punched holes, or detection of creases, etc.), and necessary processing is performed.

In order to secure the accuracy of the determination of attributes of images in the digitization, however, a user needs to visually check whether the attribute of an image obtained by automatic determination is correct, and the efficiency of checking work is low.

The disclosure has been made in view of the above-mentioned problem, and it is an object thereof to improve the efficiency of work for checking an image obtained by imaging by a user.

An example of this disclosure is an information processing device, including a processor configured to execute: acquiring a plurality of images obtained by imaging a plurality of subjects; acquiring, for each of the plurality of images, a certainty factor with which the image has the predetermined attribute; determining, for each of the plurality of images, whether the certainty factor is less than a predetermined reference; and notifying a user of an image of which the certainty factor is determined to be less than the predetermined reference.

This disclosure can be grasped as an information processing device, a system, a method executed by a computer, or a program for causing a computer to execute. This disclosure can be also grasped as a recording medium which is readable by a computer and other devices and machines and in which such a program is recorded. The recording medium that is readable by a computer and the like is a recording medium in which information such as data and programs is accumulated by electric, magnetic, optical, mechanical, or chemical action and which can be read from the computer and the like.

According to this disclosure, the efficiency of work for checking an image obtained by imaging by a user can be improved.

DESCRIPTION OF EMBODIMENTS

Figure 1:
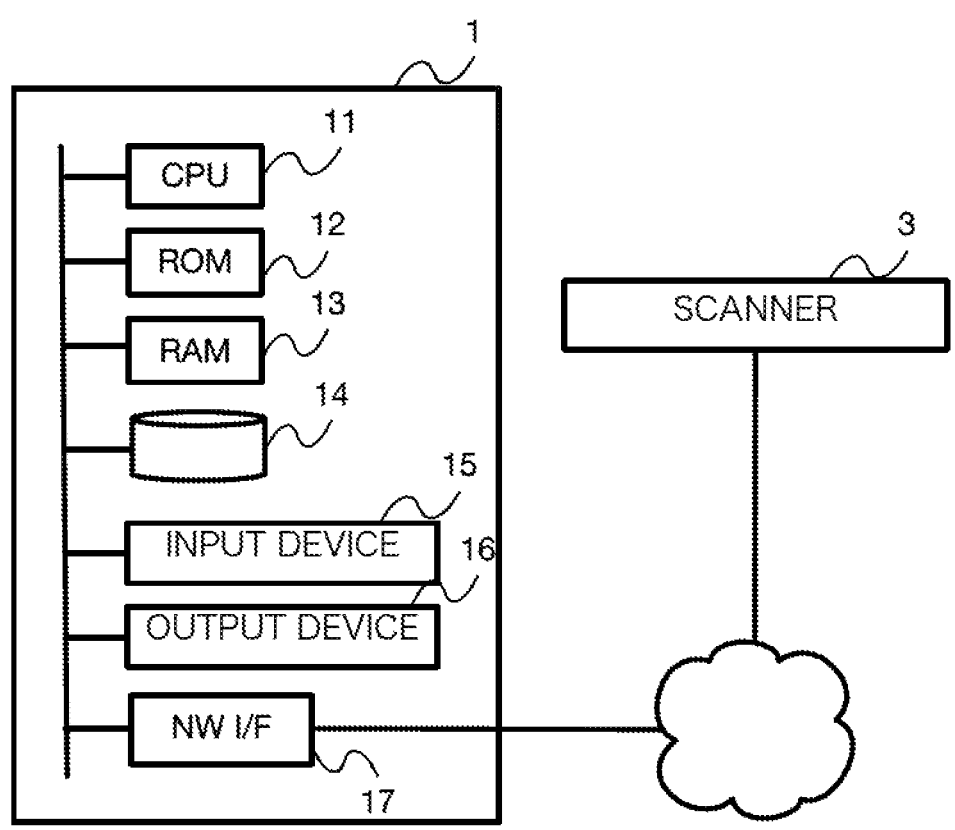
FIG. 1 is a schematic diagram illustrating a configuration of a system according to embodiments.

An information processing device, a method, and a program according to embodiments of this disclosure are described below with reference to the drawings. The embodiments described below are illustrative of embodiments, and are not intended to limit the information processing device, the method, and the program according to this disclosure to specific configurations described below. For embodiment, specific configurations suited for an embodiment mode may be appropriately employed, and various improvements and modifications may be made.

In this embodiment, an embodiment where the information processing device, the method, and the program according to this disclosure are implemented in a quality check work assist system for digitalized forms is described. The information processing device, the method, and the program according to this disclosure can be widely used for a technology for checking an image obtained by imaging by a user, and the application of this disclosure is not limited to examples described in the embodiments. For example, the technology related to this disclosure may be used for a system for imaging various subjects including forms, documents, business cards, receipts, and photographs/illustrations and saving image data, so as to check various attributes including the type of form, color/monochrome, whether the orientation of an image is correct, whether a subject is blank paper, detection of punched holes, and detection of original creases.

In a form digitalization business task, a massive number of forms are frequently processed, and at the same time, the purpose is to archive the forms on the assumption that originals are discarded, and hence deliverables are frequently required to be classified and determined with extremely high accuracy. Thus, for accurate digitalization, an image quality checking step is conventionally provided after image data is obtained by imaging a subject. In the conventional quality checking work, an operator visually checks images one by one to determine whether the image satisfies a required quality reference, and when it is determined that correction is needed, the image is corrected or the subject is scanned again. Examples of the quality checking work include (1) a work for performing monochrome binarization because a scanned image is not a monochrome binary although the scanned image is a form of a type that needs to be converted into monochrome binary values, (2) a work for rotating and correcting an image in a correct direction because the orientation of the image is wrong, and (3) a work for correcting (adding a deletion flag) such that an image is not output because a subject is a blank original and the image thereof is to be output.

In sites of digitalization business tasks where determination results are manually checked, however, there are (1) a problem in that the operator who performs the works processes a massive number of forms every day, and hence the operator may overlook a determination failure, and (2) a problem in that it takes time to check images one by one in order to prevent the overlooking of determination failures or a plurality of operators manually check the images, and hence the efficiency of digitalization business is deteriorated.

Thus, a technology for assisting the digitalization, such as determination processing including form determination, original orientation determination, blank paper determination, original color determination, punched hole determination, and original crease determination, and correction processing for appropriately correcting each image in accordance with the determination results, has been conventionally employed. Examples of the determination/correction processing include (1) determination/correction processing in which when it is determined by form determination that a form is of a predetermined form type, the color of an image of the form is corrected to monochrome binary values, and an image determined to be of another form type is output in color, (2) determination/correction processing in which when it is determined by original orientation determination that the orientation is upside down, the image is rotated by 180 degrees and corrected to an image facing upward, and (3) determination/correction processing in which when it is determined by blank paper determination that a subject is a blank original, an image thereof is not output (deleted).

In the automatic determination/correction processing, however, it is difficult to perform determination and correction for digitalizing forms with sufficient quality and accuracy. Thus, in actual form digitalization business tasks, there are many sites where determination results of forms are manually checked one by one.

In other words, the conventional quality checking work takes time and burden, and efficiency digitalization is not implemented. On the other hand, the quality of digitalization cannot be secured only by automatic determination/correction processing where visual checking is not performed. In view of the circumstances described above, in a system described in this embodiment, in order to reduce the burden for visually determining scanned images one by one by an operator and maintain the accuracy of digitalized deliverables to be high, (1) means for feeding whether an attention is required by a quality checking work back to a user based on a certainty factor (described later) of determination processing and (2) means for more easily correcting an image when it is determined that the image needs to be corrected by the quality checking work are provided. Consequently, even when there are a massive amount of forms, the forms can be accurately detected and corrected without any determination failure (operator does not overlook determination failures) and without requiring large man-hours.

Configuration of System

FIG. 1 is a schematic diagram illustrating a configuration of a system according to this embodiment. The system according to this embodiment includes a scanner 3 and an information processing device 1 that are communicably connected to each other through a network or other communication means.

The information processing device 1 is a computer including a central processing unit (CPU) 11, a read only memory (ROM) 12, a random access memory (RAM) 13, a storage device 14 such as an electrically erasable and programmable read only memory (EEPROM) and a hard disk drive (HDD), an input device 15 such as a keyboard, a mouse, and a touch panel, an output device 16 such as a display, and a communication unit 17. The specific hardware configuration of the information processing device 1 may be appropriately omitted, replaced, or added depending on embodiments. The information processing device 1 is not limited to a device formed of a single casing. The information processing device 1 may be implemented by a plurality of devices by using technologies such as so-called crowd computing and distributed computing.

The scanner 3 is a device for acquiring image data by imaging an original, such as a document, a business card, a receipt, or a photograph/illustration, set by a user. In this embodiment, the scanner 3 is exemplified as a device for acquiring an image to be processed, but the device used to acquire an image is not limited to a so-called scanner. For example, a digital camera or a digital camera built in a smartphone/tablet may be used to image a subject to obtain an image.

The scanner 3 according to this embodiment has a function of transmitting image data obtained by imaging to the information processing device 1 through a network. The scanner 3 may further have a user interface for enabling input/output of characters and selection of items, such as a touch panel display and a keyboard, and a web browsing function and a server function. The communication means and the hardware configuration of a scanner that can employ the method according to this embodiment are not limited to the exemplification in this embodiment.

Figure 2:
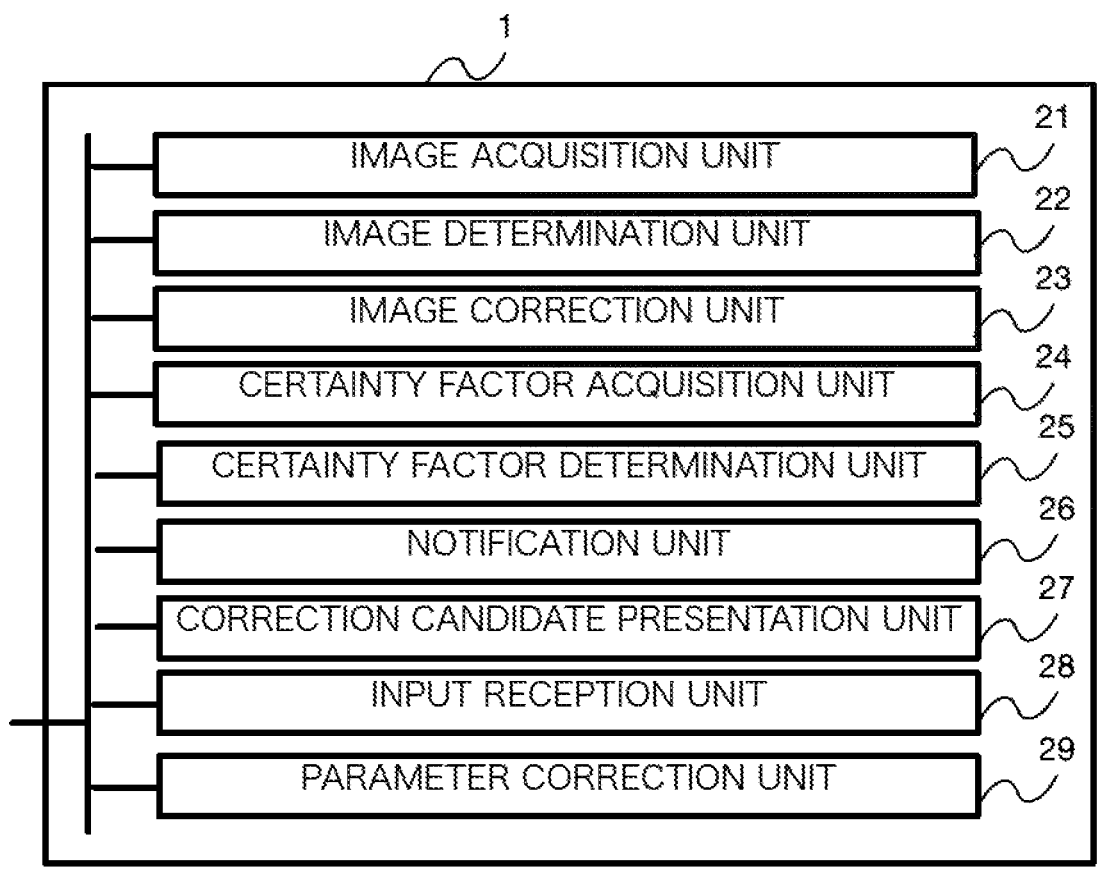
FIG. 2 is a diagram illustrating the outline of a functional configuration of an information processing device according to the embodiments.

FIG. 2 is a diagram illustrating the outline of a functional configuration of the information processing device 1 according to this embodiment. The information processing device 1 functions as an information processing device including an image acquisition unit 21, an image determination unit 22, an image correction unit 23, a certainty factor acquisition unit 24, a certainty factor determination unit 25, a notification unit 26, a correction candidate presentation unit 27, an input reception unit 28, and a parameter correction unit 29 when a program recorded in the storage device 14 is read onto the RAM 13 and executed by the CPU 11 such that pieces of hardware in the information processing device 1 are controlled. In this embodiment and other embodiments described later, the functions in the information processing device 1 are executed by the CPU 11 as a general-purpose processor, but a part or whole of the functions may be executed by one or a plurality of dedicated processors.

The image acquisition unit 21 acquires a plurality of images obtained by imaging a plurality of subjects.

The image determination unit 22 calculates, for each of the plurality of images, a certainty factor (likelihood) by which the image has a predetermined attribute, and determines whether the image has the predetermined attribute based on the calculated certainty factor (hereinafter referred to as "attribute determination processing"). In this embodiment, a value (certainty factor/likelihood) indicating how likely the attribute is, and the attribute is determined based on the value. For example, when there are a plurality of attribute candidates, the attribute is determined based on a candidate having the highest certainty factor. For example, when a certainty factor by which the original is oriented in a correct direction is 60% and a certainty factor by which the original is in a direction rotated by 180 degrees (needs to be rotated and corrected by 180 degrees) is 40%, it is determined by the original orientation determination that the original is oriented in the correct direction. In this embodiment, contents related to correction to be applied to an image are determined as predetermined attributes. The attribute determined by the image determination unit 22 only needs to be an attribute that can be acquired from a taken image, and is not limited to the exemplification in this embodiment.

The image correction unit 23 corrects the acquired image. The image correction unit 23 may automatically correct the image in accordance with correction contents (attribute) having the highest certainty factor, or may correct the image in accordance with correction contents instructed by the user.

The certainty factor acquisition unit 24 acquires, for each of the plurality of images, the certainty factor for the predetermined attribute calculated by the image determination unit 22.

The certainty factor determination unit 25 determines, for each of the plurality of images, whether the certainty factor for the attribute in the image is less than a predetermined reference.

The notification unit 26 notifies the user through the output device 16 of the image of which the certainty factor is determined by the image determination unit 22 to be less than the predetermined reference and the predetermined attribute determined to be included in the image (contents of attribute of which certainty factor is determined to be less than predetermined reference) as determination results by the image determination unit 22.

When the notification unit 26 presents all images including images of which the certainty factor is not less than the predetermined reference to the user, the notification unit 26 outputs an image of which the certainty factor is determined to be less than the predetermined reference by adding predetermined indication (for example, purple or red border), so that the user is notified of the images of which the certainty factors are determined to be less than the predetermined reference. In this case, it is preferred that the notification unit 26 preferentially notify the user of images having low certainty factors (such that images are presented to user in early stage after start of work). The reason is that when images are manually and visually checked, it is considered that the probability by which the user overlooks an image whose quality does not satisfies the reference increases due to fatigue and decrease in concentration as time has elapsed from the start of the work.

The notification unit 26 may present only images of which the certainty factors are determined to be less than the predetermined reference among the plurality of images to the user, so that the user is notified of the images of which the certainty factors are determined to be less than the predetermined reference.

The correction candidate presentation unit 27 presents correction candidates to the user through the output device 16. When an image to be processed is an uncorrected image, the correction candidate presentation unit 27 presents correction contents having the highest certainty factor to the user as a correction candidate. When an image to be processed is an image that has been corrected by the image correction unit 23, the correction candidate presentation unit 27 presents correction contents having the second and subsequent highest certainty factors to the user as correction candidates. In this case, the correction candidate presentation unit 27 presents correction candidates to the user in accordance with the order of the certainty factor for correction contents (priority is given on correction contents having high certainty factors).

The input reception unit 28 receives, from the user that has been notified by the notification unit 26, through the input device 15, an input related to right/wrong of the determination results by the image determination unit 22.

The parameter correction unit 29 changes parameters used by the image determination unit 22 in accordance with the received input of right/wrong.

Flow of Processing

Next, the flow of processing executed by the information processing device 1 according to this embodiment is described. Specific contents and processing order of the processing described below are an example for implementing this disclosure. The specific processing contents and the processing order may be appropriately selected depending on embodiments of this disclosure.

Figure 3:
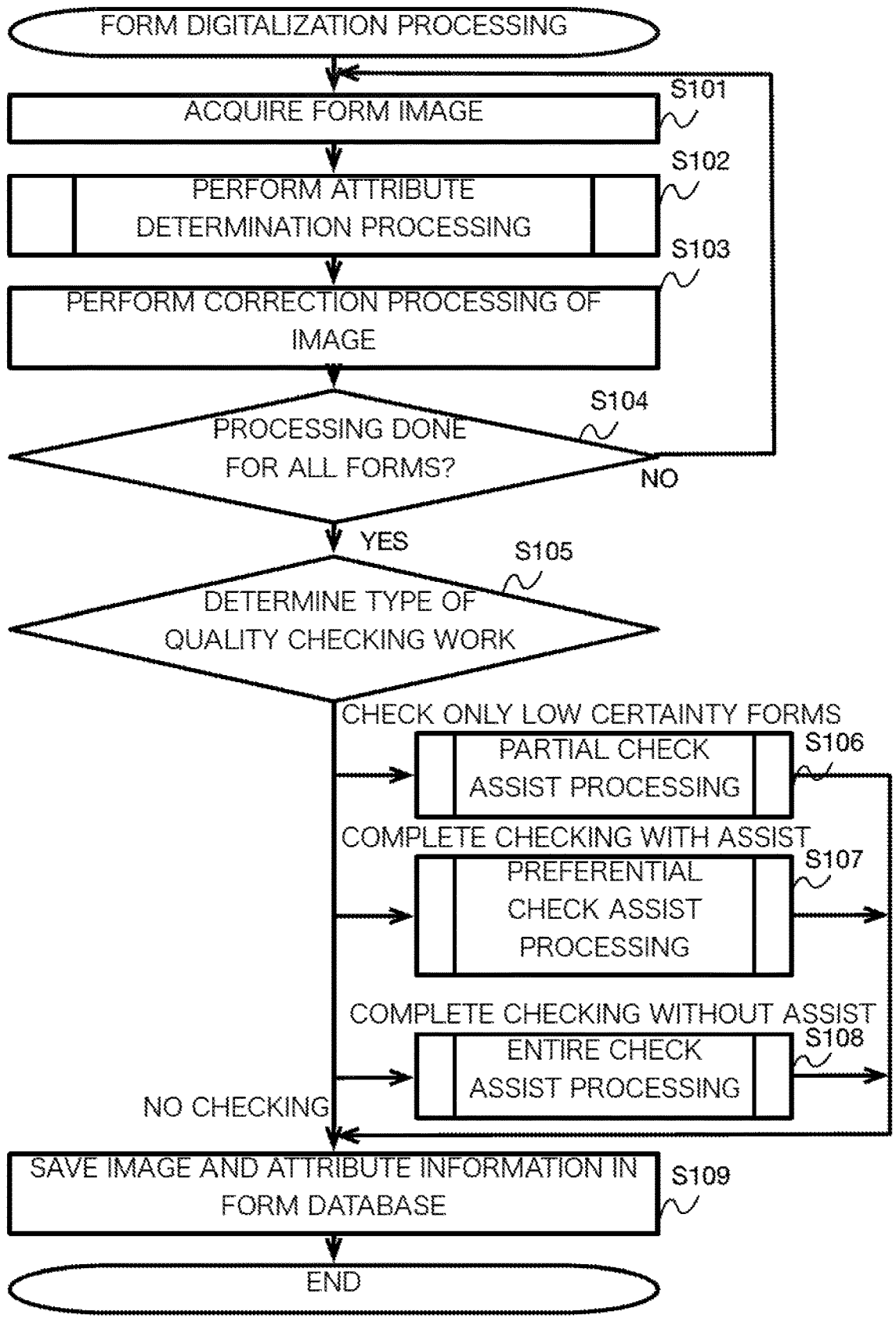
FIG. 3 is a flowchart illustrating the outline of the flow of form digitalization processing according to the embodiments.

FIG. 3 is a flowchart illustrating the outline of the flow of form digitalization processing according to this embodiment. The processing indicated by this flowchart is executed when a form digitalization work is started.

In Step S101 and Step S102, a form image is acquired, and attribute determination processing is executed. The image acquisition unit 21 acquires an image obtained by the scanner 3 imaging a subject (form in this embodiment) (Step S101). The image determination unit 22 executes attribute determination processing for one or a plurality of attributes of the acquired image (Step S102). The attribute determination processing executed in this embodiment specifically includes orientation determination processing and blank paper determination processing.

In the orientation determination processing, the image determination unit 22 binarizes the image acquired in Step S101, and extracts candidates of a character string included in the binarized image. The image determination unit 22 smooths the edges of the four sides (top, bottom, left, and right sides) of an image of the extracted character string to obtain an approximate line, and counts the proportion by which pixels of the sides ride on the line, thereby calculating the linearity (in other words, 100% indicates a complete straight line). In many languages, the shape of an upright character string has an uneven upper side and a flat lower side, and hence a side having the highest linearity can be estimated as the lower side of the extracted character string. Thus, in this embodiment, the highest value of the calculated linearities of the four sides is used as a certainty factor, and the image determination unit 22 estimates a side related to the highest value as the lower side of the character string when the certainty factor is equal to or higher than a threshold (for example, 80%). When the position of the determined lower side of the character string (which of upper, lower, left, and right positions) matches the position (for example, lower) of the lower side a character string set for the form in advance, the image determination unit 22 determines that the orientation of the image is correct, and when the position of the determined lower side of the character string is different from the position of the lower side of the character string set for the form in advance, the image determination unit 22 determines that the orientation of the image is wrong.

In the blank paper determination processing, the image determination unit 22 binarizes the image acquired in Step S101, and calculates a proportion (black pixel rate) by which black pixels are occupied with respect to the number of all pixels in the binarized image. The image determination unit 22 performs predetermined conversion on the calculated black pixel rate to calculate a certainty factor. For example, the image determination unit 22 performs conversion such as "certainty factor=100−(black pixel rate×50)", such that the black pixel rate corresponds to 2% from 0 and the certainty factor corresponds to 0% from 100 (black pixel rate of 0% indicates that certainty factor of blank paper is 100%, and black pixel rate of 2% indicates that certainty factor of blank paper is 0%).

In this manner, the orientation determination processing and the blank paper determination processing included in the attribute determination processing are executed. The attribute determination processing is processing for determining whether an image has a predetermined attribute. In the determination, as long as determination means for calculating a certainty factor (likelihood) and determining whether an image has a predetermined attribute based on the calculated certainty factor is employed, the type of attributes specifically determined and means for the determination are not limited. The attribute and the certainty factor obtained as a result of the attribute determination processing are added to a subject image as meta information. When the attribute determination processing is finished, the processing proceeds to Step S103.

In Step S103, correction processing is executed. The image correction unit 23 corrects the image in accordance with the result of the attribute determination processing executed in Step S102. For example, when it is determined that the orientation of the subject image is different from a prescribed orientation, the image correction unit 23 rotates the subject image such that the orientation of the subject image matches the prescribed orientation to correct the orientation of the image. For example, when it is determined that a subject image is blank paper, the image correction unit 23 adds a deletion flag to the subject image. After that, the processing proceeds to Step S104.

In this embodiment, an image is automatically corrected in accordance with the result of the attribute determination processing, but the automatic correction processing may be omitted. For example, the correction processing may be executed in accordance with an instruction by a user after the checking work (described later) by the user.

In Step S104, it is determined whether the processing from Step S101 to Step S103 has been completed for all forms to be processed. When there is a form for which the processing has not been completed, the processing returns to Step S101. On the other hand, when it is determined that the predetermined processing has been completed for all forms to be processed, the processing proceeds to Step S105.

In Step S105 to Step S108, assist processing for the selected quality checking work is executed. The type of quality checking work is determined from among "checking of only forms having low certainty factor", "complete checking with assist", "complete checking without assist", and "no checking" depending on the contents input by the user and the contents set in advance (Step S105).

When the type of the determined quality checking work is "checking of only forms having low certainty factor", partial check assist processing is executed (Step S106). When the type of the determined quality checking work is "complete checking with assist", preferential check assist processing is executed (Step S107). When the type of the determined quality checking work is "complete checking without assist", complete check assist processing (in other words, the same processing as processing employed in conventional quality checking work) is executed (Step S108). When the type of the determined quality checking work is "no checking", the quality checking work is skipped. Details of the partial check assist processing, the preferential check assist processing, and the complete check assist processing executed in Step S106 to Step S108 are described later. After that, the processing proceeds to Step S109.

In Step S109, the image of the form and the attribute information thereof are saved. The information processing device 1 saves images obtained by the processing from Step S101 to Step S108 and related attribute information in a form database built in the storage device 14 or on a network as digitalize form data. After that, the processing indicated by this flowchart is finished.

Figure 4:
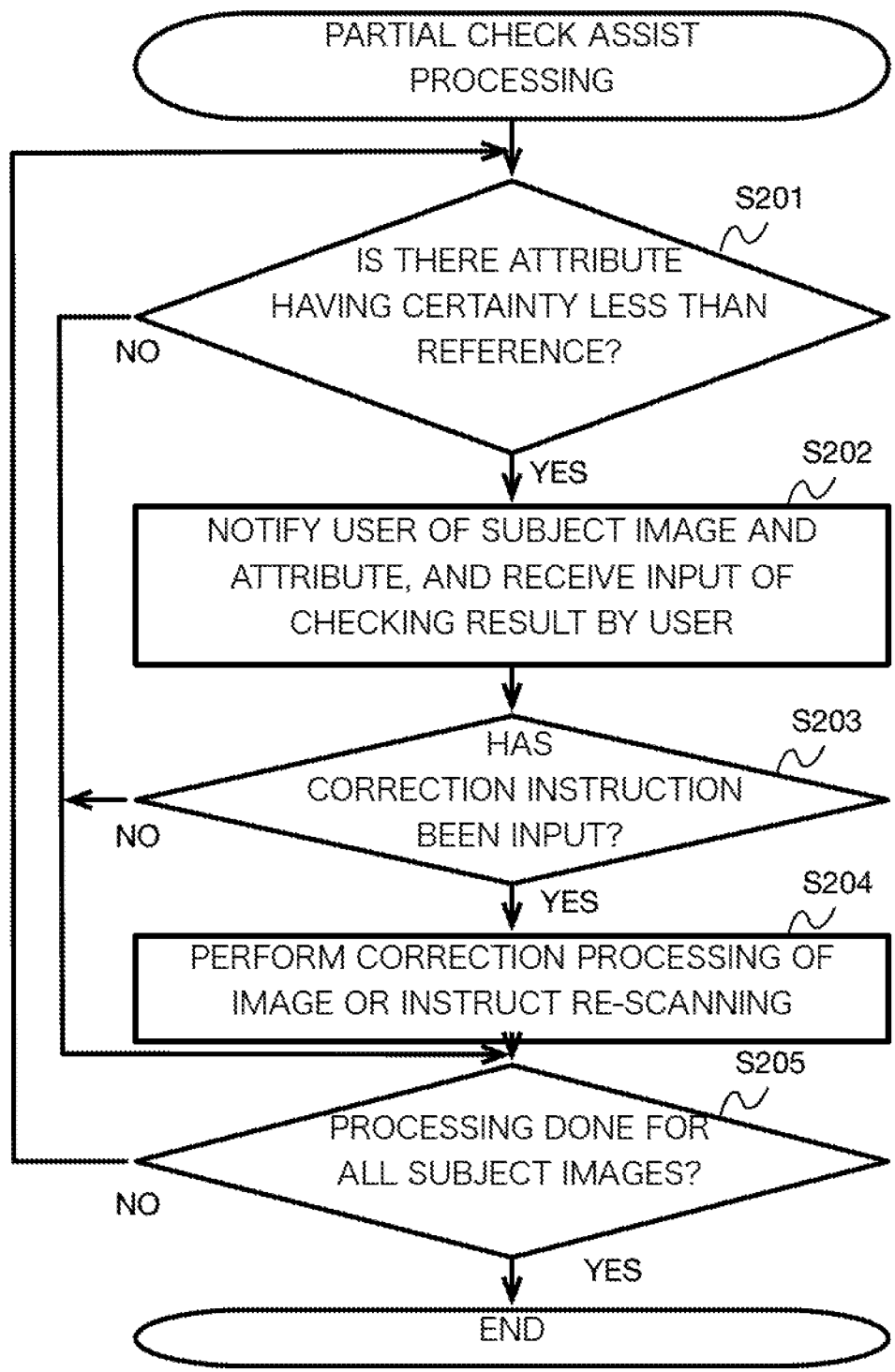
FIG. 4 is a flowchart illustrating the outline of the flow of partial check assist processing according to the embodiments.

FIG. 4 is a flowchart illustrating the outline of the flow of partial check assist processing according to this embodiment. The processing indicated by this flowchart corresponds to Step S106 in the form digitalization processing described above with reference to FIG. 3. In the partial check assist processing, only images of which the certainty factors are determined to be less than a predetermined reference among a plurality of images are presented to the user.

In Step S201, the presence/absence of attributes having certainty factors less than a reference is determined. The certainty factor acquisition unit 24 acquires attributes of an image to be processed and a certainty factor for each attribute, which are obtained by the attribute determination processing executed in Step S102, from meta information added to the image to be processed. The certainty factor determination unit 25 determines whether the image to be processed has an attribute of which the certainty factor is less than a predetermined reference, thereby determining whether an attention needs to be notified to the user about the image.

As used herein, "less than predetermined reference" refers to, for example, (1) the case where the certainty factor is equal to or lower than a threshold (for example, 20%) set in advance, (2) the case where the certainty factor is an outlier (such as outside of normalized distribution 3σ) due to results and statistics of batch processing (for example, from statistics of all scans on a subject day), and (3) the case where the certainty factor is equal to or lower than a threshold (notification reference) designated by the user. When it is determined that there is no attribute having a certainty factor less than a reference, the processing proceeds to Step S205. On the other hand, when it is determined that there is an attribute having a certainty factor less than the reference, the processing proceeds to Step S202.

In Step 3202, the subject image and the attributes of the subject image are notified to the user, and the user is prompted to check the subject image by visual. The notification unit 26 presents the image to be processed to the user, and prompts the user to visually check the attribute of which the certainty factor is determined to be less than the reference in Step S201.

Figure 5:
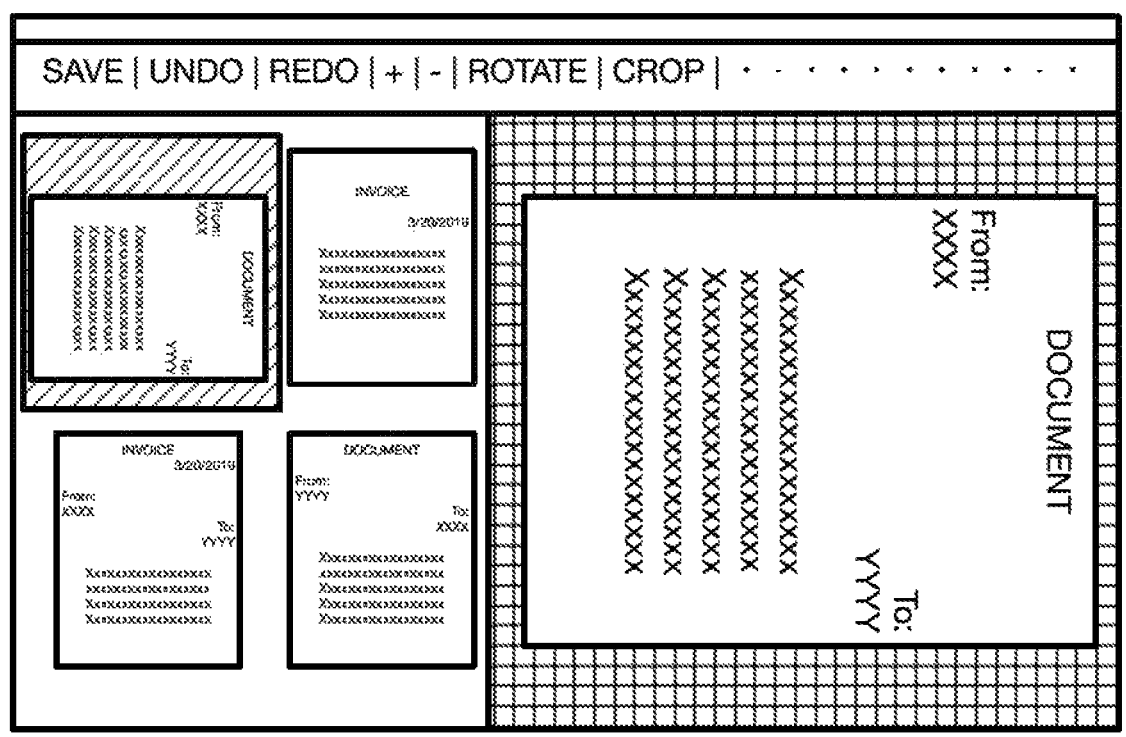
FIG. 5 is a diagram illustrating a quality check screen in the partial check assist processing in the embodiments.

FIG. 5 is a diagram illustrating a quality check screen in the partial check assist processing in this embodiment. On the quality check screen according to this embodiment, a list of images are displayed in the left field, and an image of the form presented as a subject to be currently checked is displayed in the right field. Of the images displayed in the left field as a list, an image with a shaded border is the image to be currently checked in the right field. On the quality check screen in the partial check assist processing, thumbnails of only form images of which certainty factors are determined to be less than the predetermined reference among the plurality of images are displayed in the left field. Filtering processing for narrowing down the images to images with less than the reference may be omitted such that thumbnails of all images may be displayed in the left field. When the filtering is omitted, it is preferred that emphasized display for visually highlighting the image be performed by a method such as changing the color of the border of the image (for example, to purple or red).

The user visually checks the image displayed in the right field to check whether the image satisfies a quality reference as an electronic form, and inputs the checking result (whether the image satisfies a prescribed quality reference as an electronic form).

In Step S202, the notification unit 26 may present correction candidates of the image to the user. When an image to be processed is an uncorrected image, the correction candidate presentation unit 27 presents correction contents having the highest certainty factor to the user as a correction candidate. When an image to be processed is an image that has been corrected by the image correction unit 23, the correction candidate presentation unit 27 presents correction contents having the second and subsequent highest certainty factors to the user as correction candidates. In this case, the correction candidate presentation unit 27 presents correction candidates to the user in accordance with the order of certainty factor for correction contents.

Figure 6:
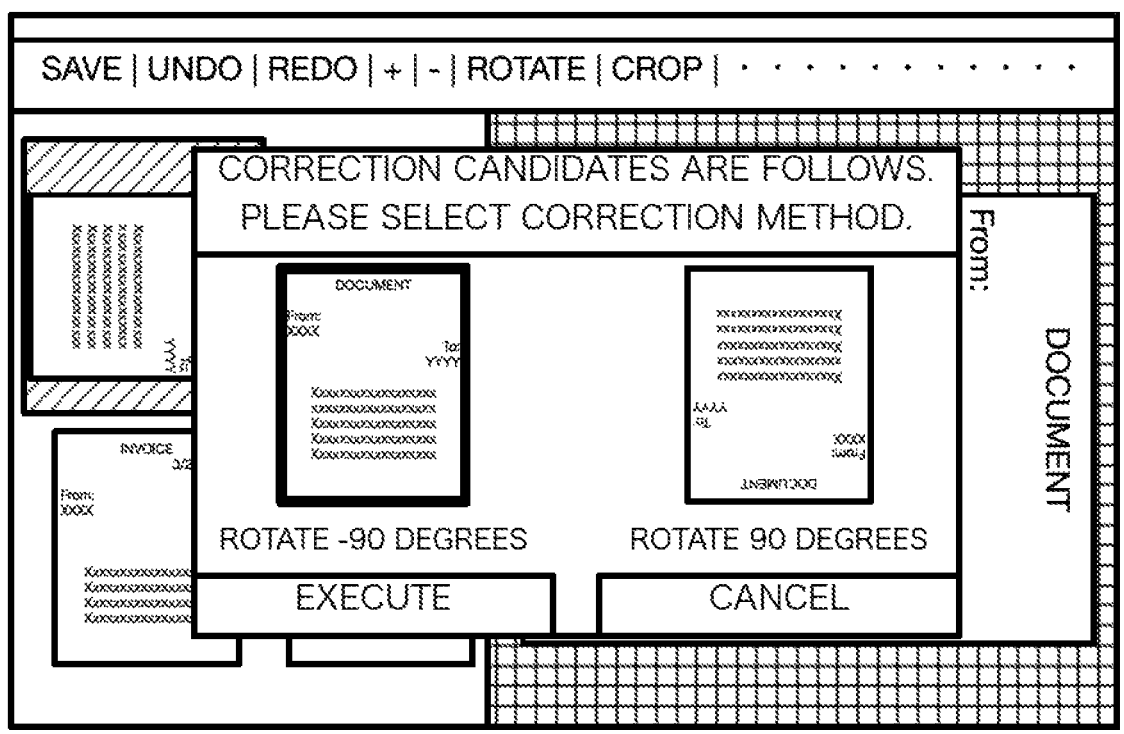
FIG. 6 is a diagram illustrating a correction candidate presentation screen in the embodiments.

FIG. 6 is a diagram illustrating a correction candidate presentation screen in this embodiment. In the example of the correction candidate presentation screen illustrated in FIG. 6, correction contents such that a side having the second highest certainty factor (linearity) becomes the lower side and correction contents such that a side having the third highest certainty factor (linearity) becomes the lower side of an image whose rotation has been corrected such that the side having the highest certainty factor (linearity) becomes the lower side are presented as correction candidates. The user checks the presented correction candidates, and selects the correct correction candidate and inputs a correction instruction. After that, the processing proceeds to Step S203.

In Step S203, contents input by the user are determined. The input reception unit 28 receives the input by the user, and determines the received contents. When the input contents are contents indicating that the image satisfies a quality reference as an electronic form (for example, input indicating "OK" or input indicating that further correction is not required), the processing proceeds to Step S205. On the other hand, when the input contents are contents indicating that the image does not satisfy a quality reference as an electronic form or contents instructing correction, the processing proceeds to Step S204.

In Step S204, the image is corrected or the form is scanned again. When the contents input by the user are contents instructing correction, the image correction unit 23 corrects the image in accordance with the correction instruction by the user. When the contents input by the user are contents indicating that the image has quality in which the problem is not solved by correction (for example, when a transporting distortion occurs in an original and its image is greatly distorted or when the original creases so greatly that a part of the contents cannot be read), the information processing device 1 discards the subject image, and outputs a notification for prompting the re-scanning of the form related to the subject image. After that, the processing proceeds to Step S205.

In Step S205, it is determined whether the processing from Step S201 to Step S204 has been completed for all images to be processed. When there is an image for which the processing has not been completed, the next image to be processed is selected, and the processing returns to Step S201. On the other hand, it is determined whether the predetermined processing has been completed for all images to be processed, the processing indicated by this flowchart is finished.

Figure 7:
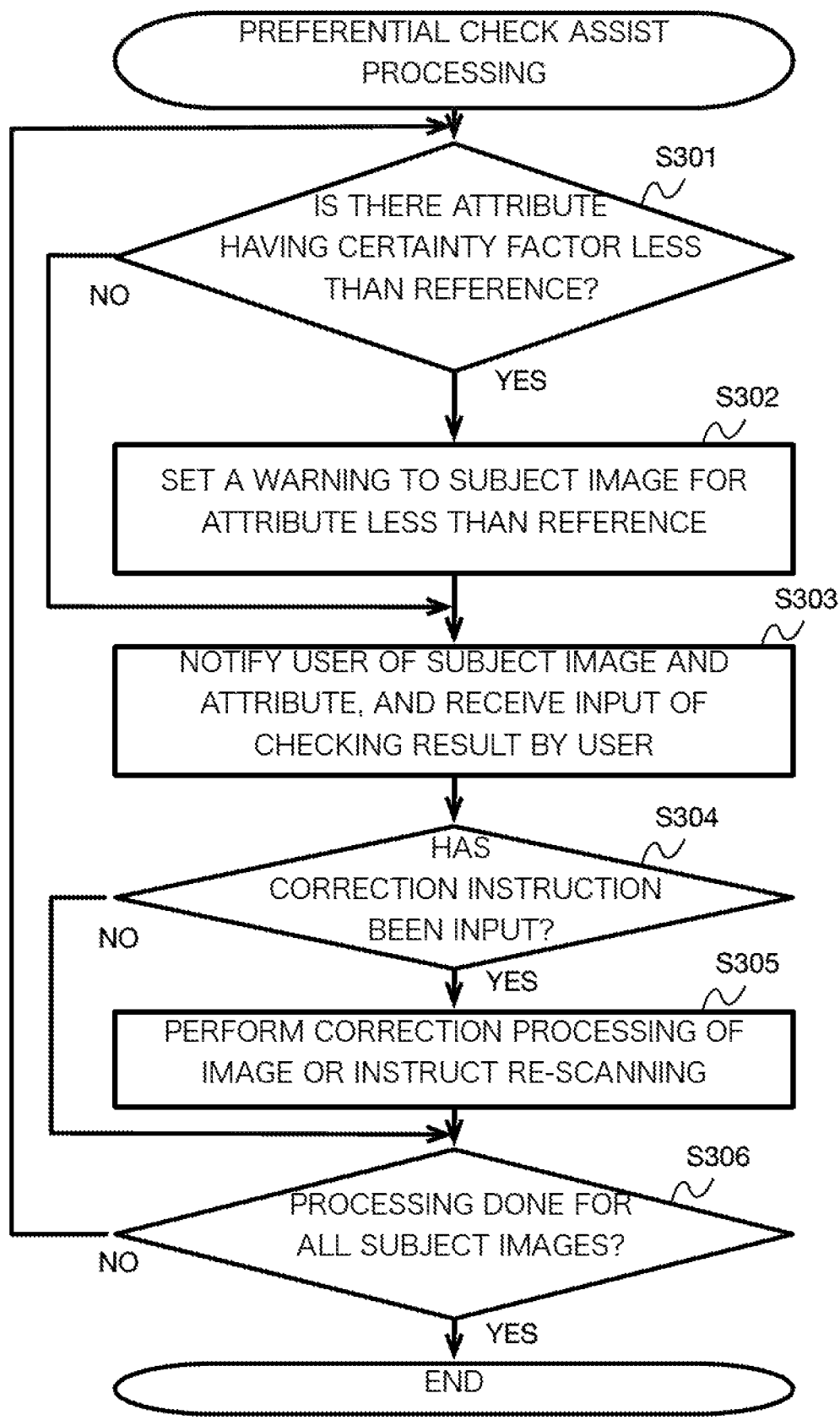
FIG. 7 is a flowchart illustrating the outline of the flow of preferential check assist processing according to the embodiments.

FIG. 7 is a flowchart illustrating the outline of the flow of the preferential check assist processing according to this embodiment. The processing indicated by this flowchart corresponds to Step S107 in the form digitalization processing described above with reference to FIG. 3. In the preferential check assist processing, all scanned images are presented to the user, and of the images, images of which the certainty factors are determined to be less than the predetermined reference are presented such that a particular attention is paid to the user.

In Step S301 and Step S302, when the image to be processed has an attribute of which the certainty factor is less than the reference, a warning is set to the image. The certainty factor acquisition unit 24 acquires the attributes of the image to be processed and the certainty factor for each attribute, which are obtained by the attribute determination processing executed in Step S102, from meta information added to the subject image. The certainty factor determination unit 25 determines whether the image to be processed has an attribute of which the certainty factor is less than a predetermined reference, thereby determining whether an attention needs to be notified to the user about the image (Step S301).

When it is determined that the image to be processed has an attribute of which the certainty factor is less than the reference, the notification unit 26 sets a warning for notifying the user that the user needs to visually check the attribute of which the certainty factor is determined to be less than the reference of the subject image with a particular attention when checking the image (Step S302). On the other hand, when it is determined that there is no attribute of which the certainty factor is less than the reference, the processing of Step S302 is skipped. After that, the processing proceeds to Step S303.

In Step S303, the subject image and the attributes of the subject image are notified to the user, and the user is prompted to check the subject image by visual. The notification unit 26 presents the image to be processed to the user, and prompts the user to visually check the subject image and the attributes. When the presented form image is a form image for which a warning is set in Step S302, the notification unit 26 warns the user to visually check the subject image and the attributes with a particular attention when displaying the subject image and the attributes in the right field of the quality check screen.

Figure 8:
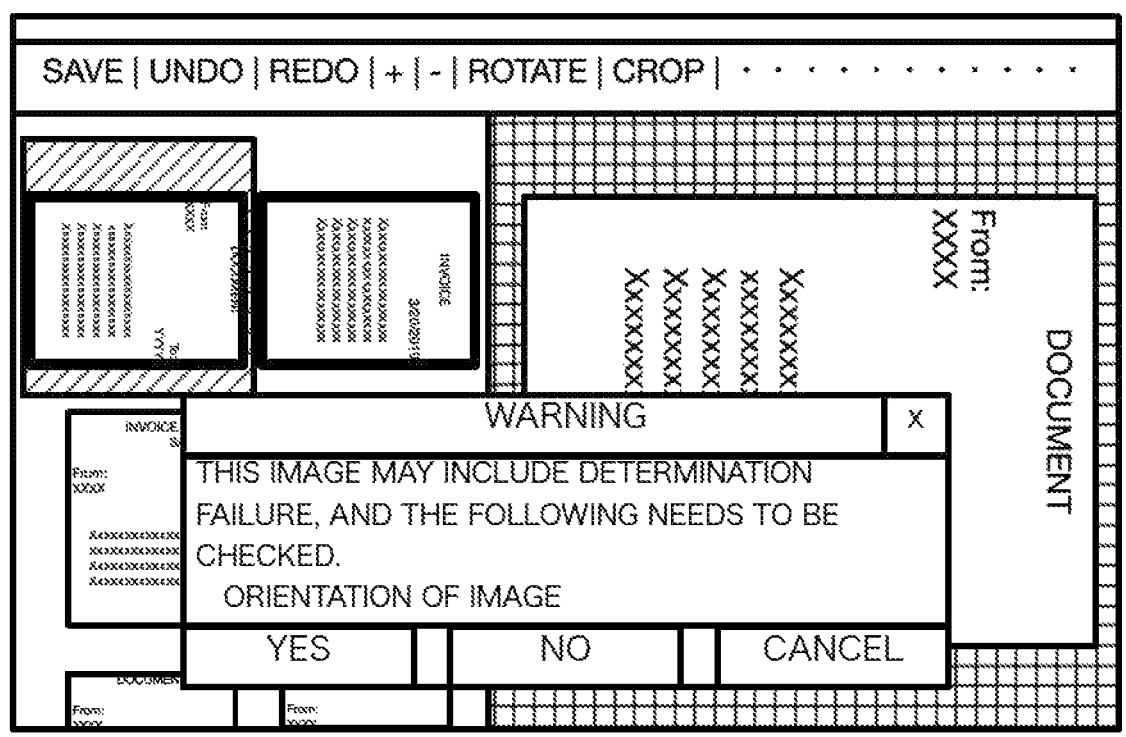
FIG. 8 is a diagram illustrating a quality check screen in the preferential check assist processing in the embodiments.

FIG. 8 is a diagram illustrating a quality check screen in the preferential check assist processing in this embodiment.

On the quality check screen according to this embodiment, a list of images are displayed in the left field, and an image of the form presented as a subject to be currently checked is displayed in the right field. On the quality check screen in the preferential check assist processing, thumbnails of all form images obtained by scanning are displayed in the left field. On the quality check screen in the preferential check assist processing, of the thumbnails displayed in the left field, a form image for which a warning is set in Step S302 is displayed with emphasis such that the image is visually highlighted by a method such as changing the color of the border (for example, to purple or red) (displayed with thick border in figure).

On the quality check screen illustrated in FIG. 8, when the form image for which a warning is set is displayed in the right field, a warning window for warning the user to visually check the form image with a particular attention is displayed.

The user visually checks the image displayed in the right field to check whether the image satisfies a quality reference as an electronic form, and inputs the checking result (whether the image satisfies a prescribed quality reference as an electronic form). When the input is received, the notification unit 26 may issue a warning or make screen transition for prompting the user to check the subject image again.

The description in Step S303 where image correction candidates may be presented to the user is the same as that of the partial check assist processing (see FIG. 4) described above, and hence the description is omitted. After that, the processing proceeds to Step S304.

In Step S304, the contents input by the user are determined. The input reception unit 28 receives the input made by the user, and determines the received contents. When the input contents are contents indicating that the image satisfies a quality reference as an electronic form, the processing proceeds to Step S306. On the other hand, when the input contents are contents indicating that the image does not satisfy a quality reference as an electronic form or contents instructing correction, the processing proceeds to Step S305.

In Step S305, the image is corrected or the form is scanned again. When the contents input by the user are contents instructing correction, the image correction unit 23 corrects the image in accordance with the correction instruction by the user. When the contents input by the user are contents indicating that the image has quality in which the problem is not solved by correction, the information processing device 1 discards the subject image, and outputs a notification for prompting the re-scanning of the form related to the subject image. After that, the processing proceeds to Step S306.

In Step S306, it is determined whether the processing from Step S301 to Step S305 has been completed for all images to be processed. When there is an image for which the processing has not been completed, the next image to be processed is selected, processing returns to Step S301. On the other hand, when it is determined that the predetermined processing has been completed for all images to be processed, the processing indicated by this flowchart is finished.

Figure 9:
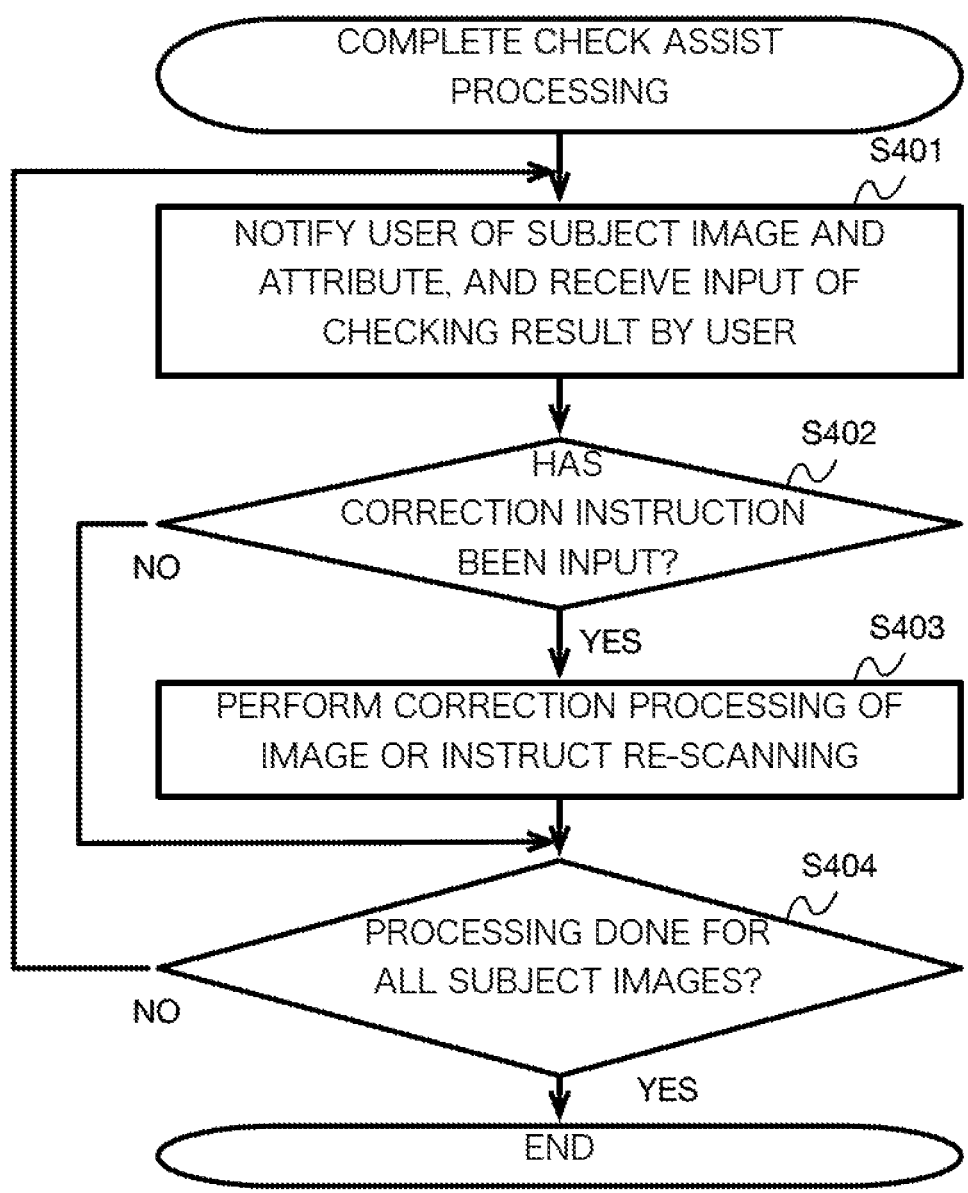
FIG. 9 is a flowchart illustrating the outline of the flow of complete check assist processing according to the embodiments.

FIG. 9 is a flowchart illustrating the outline of the flow of the complete check assist processing according to this embodiment. The processing indicated by this flowchart corresponds to Step S108 in the form digitalization processing described above with reference to FIG. 3. In the complete check assist processing, all scanned images are presented to the user.

In Step S401, a subject image and attributes of the subject image are notified to the user, and the user is prompted to check the subject image by visual. The notification unit 26 presents the subject image and the attributes determined for the subject image to the user, and prompts the user to visually check the subject image and the attributes.

The user visually checks the image displayed in the right field to check whether the image satisfies a quality reference as an electronic form, and inputs the checking result (whether the image satisfies a prescribed quality reference as an electronic form). The description in Step S401 where image correction candidates may be presented to the user is the same as that of the partial check assist processing (see FIG. 4) described above, and hence the description is omitted. After that, the processing proceeds to Step S402.

In Step S402, the contents input by the user are determined. The input reception unit 28 receives the input made by the user, and determines the received contents. When the input contents are contents indicating that the image satisfies a quality reference as an electronic form, the processing proceeds to Step S404. On the other hand, when the input contents are contents indicating that the image does not satisfy a quality reference as an electronic form or contents instructing correction, the processing proceeds to Step S403.

In Step S403, the image is corrected or the form is scanned again. When the contents input by the user are contents instructing correction, the image correction unit 23 corrects the image in accordance with the correction instruction by the user. When the contents input by the user are contents indicating that the image has quality in which the problem is not solved by correction, the information processing device 1 discards the subject image, and outputs a notification for prompting the re-scanning of the form related to the subject image. After that, the processing proceeds to Step S404.

In Step S404, it is determined whether the processing of Step S401 to Step S403 has been completed for all images to be processed. When there is an image for which the processing has not been completed, the next image to be processed is selected, the processing returns to Step S401. On the other hand, when it is determined that the predetermined processing has been completed for all images to be processed, the processing indicated by this flowchart is finished.

Although descriptions are omitted in the flowcharts, parameters used by the image determination unit 22 to determine attributes of an image may be changed depending on contents input by the user received in Step S202, Step S302, and Step 3401 (right/wrong of automatic determination results and correction contents instructed by user). For example, the parameter correction unit 29 can feed contents of manual correction subsequently made by the user back to the determination processing of an image having a low certainty factor, thereby making the same determination mistake less occur. More specifically, for color determination (when an image to be determined to be color is treated as being monochrome), the parameter correction unit 29 can automatically change parameters, such as varying a threshold of the certainty factor for the color determination such that images are more likely determined to be color.

For example, when it is preferred to change the setting due to the tendency of manual correction, the parameter correction unit 29 can change the setting to the fixed one automatically or by presenting to the user. More specifically, the parameter correction unit 29 can automatically change the parameters, such as when all images having low certainty factors of the orientation determination are manually corrected by rotation of 90 degrees, the parameter correction unit 29 presents the rotation of 90 degrees as fixed setting as the setting for automatically correcting the orientation. Such parameter correction can be applied to all kinds of attribute determinations without being limited to the color determination and the orientation determination.

Effects

The system according to the embodiment described above uses a certainty factor generated in the process of determination to perform complete checking, and by assisting a user to pay a particular attention to an image having a low certainty factor or checking only an image having a low certainty factor, the increase in speed and accuracy can be achieved.

What is claimed is:

1. An information processing device comprising a processor configured to execute:
   acquiring a plurality of images obtained by imaging a plurality of subjects;
   acquiring, for each of the plurality of images, a certainty factor with which the image has a predetermined attribute;
   determining, for each of the plurality of images, whether the certainty factor is less than a predetermined reference; and
   notifying a user of an image of which the certainty factor is determined to be less than the predetermined reference,
   wherein the processor presents the plurality of images to the user and the processor notifies the user of images in ascending order of certainty factors,
   wherein the predetermined attribute is a correction content to be applied to the image, and the processor presents correction candidates to the user in accordance with an order of certainty factors for the correction content,
   wherein the processor corrects the image by using a correction content having the highest certainty factor, and
   wherein the processor presents, for the image that has been corrected by the processor, correction contents having second highest and subsequent certainty factors to the user as correction candidates.

2. The information processing device according to claim 1, wherein
   the processor notifies the user of an image of which the certainty factor is determined to be less than the predetermined reference, by outputting the plurality of images and adding a predetermined indication to the image of which the certainty factor is determined to be less than the predetermined reference when the processor presents the plurality of images to the user.

3. The information processing device according to claim 1, wherein the processor notifies the user of an image of which the certainty factor is determined to be less than the predetermined reference by presenting only the image of which the certainty factor is determined to be less than the predetermined reference among the plurality of images to the user.

4. The information processing device according to claim 1, wherein
   the processor notifies the user of an attribute of which the certainty factor is determined to be less than the predetermined reference.

5. The information processing device according to claim 1, wherein
   the processor presents, for an uncorrected image, a correction content having the highest certainty factor to the user as a correction candidate.

6. The information processing device according to claim 1, wherein
   the processor processes image determination by calculating, for each of the plurality of images, the certainty factor with which the image has the predetermined attribute, and determining whether the image has the predetermined attribute based on the calculated certainty factor, wherein
   the processor acquires the certainty factor calculated in the image determination.

7. The information processing device according to claim 6, wherein
   the processor notifies the user of the predetermined attribute determined by the image determination to be included in the image as a determination result of the image determination,
   the processor receives an input of right/wrong of the determination result of the image determination which is input by the user notified by the processor; and
   the processor changes a parameter used by the image determination in accordance with the received right/wrong.

8. A method for causing a computer to execute:
   acquiring a plurality of images obtained by imaging a plurality of subjects;
   acquiring, for each of the plurality of images, a certainty factor with which the image has a predetermined attribute;
   determining, for each of the plurality of images, whether the certainty factor is less than a predetermined reference; and
   notifying a user of an image of which the certainty factor is determined to be less than the predetermined reference,
   wherein the plurality of images are presented to the user and the user is notified of images in ascending order of certainty factors, and
   wherein the predetermined attribute is a correction content to be applied to the image, and presenting correction candidates to the user in accordance with an order of certainty factors for the correction content,
   wherein the image is corrected by using a correction content having the highest certainty factor, and for the image that has been corrected, presenting correction contents having second highest and subsequent certainty factors to the user as correction candidates.

9. A non-transitory computer-readable recording medium having recorded thereon a program for causing a computer to execute:
   acquiring a plurality of images obtained by imaging a plurality of subjects;
   acquiring, for each of the plurality of images, a certainty factor with which the image has a predetermined attribute;
   determining, for each of the plurality of images, whether the certainty factor is less than a predetermined reference; and
   notifying a user of an image of which the certainty factor is determined to be less than the predetermined reference,
   wherein the plurality of images are presented to the user and the user is notified of images in ascending order of certainty factors, and wherein the predetermined attribute is a correction content to be applied to the image, and presenting correction candidates to the user in accordance with an order of certainty factors for the correction content, wherein the image is corrected by using a correction content having the highest certainty factor, and for the image that has been corrected, presenting correction contents having second highest and subsequent certainty factors to the user as correction candidates.

\* \* \* \* \*